US011333780B2

(12) United States Patent
Sodagar et al.

(10) Patent No.: US 11,333,780 B2
(45) Date of Patent: May 17, 2022

(54) METHOD AND SYSTEM FOR PROCESSING A THREE-DIMENSIONAL (3D) SEISMIC DATASET

(71) Applicant: SAUDI ARABIAN OIL COMPANY, Dhahran (SA)

(72) Inventors: Taher M. Sodagar, Dhahran (SA); Ahmed M. Alhamad, Inak (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/066,890

(22) Filed: Oct. 9, 2020

(65) Prior Publication Data

US 2022/0113439 A1 Apr. 14, 2022

(51) Int. Cl.
*G01V 1/30* (2006.01)
*E21B 49/08* (2006.01)

(52) U.S. Cl.
CPC .......... *G01V 1/302* (2013.01); *E21B 49/087* (2013.01); *G01V 1/307* (2013.01)

(58) Field of Classification Search
CPC ....... G01V 1/302; G01V 1/307; E21B 49/087
See application file for complete search history.

(56) References Cited

U.S. PATENT DOCUMENTS

| 4,363,112 | A |   | 12/1982 | Widrow |
|---|---|---|---|---|
| 5,671,136 | A | * | 9/1997 | Willhoit, Jr. ............ G01V 1/30 702/18 |
| 5,850,622 | A |   | 12/1998 | Vassiliou et al. |
| 6,052,333 | A |   | 4/2000 | Williams |
| 8,213,261 | B2 |   | 7/2012 | Imhof et al. |
| 9,279,897 | B2 |   | 3/2016 | Zuercher |
| 11,134,230 | B2 | * | 9/2021 | Naganuma ............ H04N 9/3129 |
| 2006/0235666 | A1 |   | 10/2006 | Assa et al. |
| 2011/0218737 | A1 |   | 9/2011 | Gulati |

(Continued)

FOREIGN PATENT DOCUMENTS

| CA | 1240026 A | 8/1988 |
|---|---|---|
| CN | 109001800 A | 12/2018 |

(Continued)

OTHER PUBLICATIONS

Burnett et. al.; "Application of spectral decomposition to gas basins in Mexico"; The Leading Edge; vol. 22; Issue 11; Nov. 1, 2003; pp. 1130-1134 (5 pages).

(Continued)

*Primary Examiner* — Elias Desta
(74) *Attorney, Agent, or Firm* — Osha Bergman Watanabe & Burton LLP

(57) ABSTRACT

A method of processing a three-dimensional (3D) seismic dataset includes: producing a relative amplitude preserved (RAP) processed seismic volume that includes a reservoir from the 3D seismic dataset; decomposing the RAP processed seismic volume into a first iso-frequency volume; generating a first overburden sediment interval map and a first reservoir interval zone map for the first iso-frequency volume; generating and outputting a first ratio map for the first iso-frequency volume by dividing the first overburden sediment interval map by the first reservoir interval zone map; and characterizing a fluid content of the reservoir based on the first ratio map.

20 Claims, 8 Drawing Sheets

(56) References Cited

U.S. PATENT DOCUMENTS

| | | |
|---|---|---|
| 2011/0295510 A1 | 12/2011 | Gulati |
| 2012/0090834 A1 | 4/2012 | Imhof et al. |
| 2012/0257476 A1 | 10/2012 | Muhl |
| 2015/0138915 A1 | 5/2015 | Khan et al. |
| 2015/0168574 A1 | 6/2015 | Wallet et al. |
| 2015/0369938 A1* | 12/2015 | Romero, Jr. ............ G01V 1/36 702/14 |
| 2016/0086079 A1 | 3/2016 | De Stefano |
| 2016/0313460 A1 | 10/2016 | Berron et al. |
| 2018/0024263 A1 | 1/2018 | Aarre et al. |
| 2018/0217284 A1 | 8/2018 | Zhao et al. |
| 2020/0166664 A1 | 5/2020 | Bin Gubair et al. |
| 2020/0191985 A1 | 6/2020 | Kristiansen et al. |
| 2020/0333491 A1 | 10/2020 | Bekara |
| 2020/0348432 A1* | 11/2020 | Sodagar ................ G01V 1/325 |
| 2021/0215842 A1 | 7/2021 | Liu et al. |
| 2021/0278557 A1 | 9/2021 | Awfi |

FOREIGN PATENT DOCUMENTS

| | | |
|---|---|---|
| CN | 111077570 A | 4/2020 |
| CN | 111123354 A | 5/2020 |
| CN | 111239808 A | 6/2020 |
| RU | 2007108956 A | 9/2008 |
| WO | 2008059450 A3 | 5/2008 |
| WO | 2011109839 A2 | 9/2011 |
| WO | 2019241062 A1 | 12/2019 |

OTHER PUBLICATIONS

Castagna et. al.; "Instantaneous spectral analysis: Detection of low-frequency shadows associated with hydrocarbons"; The Leading Edge; vol. 22; Issue 2; Feb. 1, 2003; pp. 120-127 (6 pages).

Chapman et. al.; "The influence of abnormally high reservoir attenuation on the AVO signature"; The Leading Edge vol. 24; Issue 11; Nov. 1, 2005; pp. 1120-1125 (5 pages).

Chen et. al.; "Spectral-decomposition response to reservoir fluids from a deepwater West Africa reservoir"; Geophysics; vol. 73, No. 6; Oct. 24, 2008; pp. C23-C30 (8 pages).

Deng et al.; "Application of Spectral Decomposition to Detect Deepwater Gas Reservoir"; Society of Exploration Geophysicists; Jan. 1, 2007; pp. 1427-1431 (5 pages).

Odebeatu et. al.; "Application of spectral decomposition to detection of dispersion anomalies associated with gas saturation"; The Leading Edge; vol. 25; Issue 2; Feb. 1, 2006; pp. 206-210 (5 pages).

Partyka et. al.; "Interpretational applications of spectral decomposition in reservoir characterization"; vol. 18; Issue 3; Mar. 1, 1999; pp. 353-360 (5 pages).

Rapoport et. al.; "Direct detection of oil and gas fields based on seismic inelasticity effect"; The Leading Edge; vol. 23; Issue 3; Mar. 1, 2004; pp. 276-278 (3 pages).

Sodagar, T.; "Revelation of the Triassic Gas Potential with Insight of Iso Frequency Spectral Decomposition in Saudi Arabia's Offshore", SPE-172625-MS; Society of Petroleum Engineers; Mar. 8, 2015 (16 pages).

Yilmaz, O.; "Seismic Data Analysis;" Society of Exploration Geophysicists; Chapter 11; vol. 2; Jan. 1, 2001; pp. 1793-2039 (247 pages).

Non-Final Office Action issued in corresponding U.S. Appl. No. 17/148,611 dated Oct. 6, 2021 (20 pages).

Non-Final Office Action issued in corresponding U.S. Appl. No. 17/064,025 dated Oct. 28, 2021 (17 pages).

Chopra, S. & Marfurt, K. J., "Seismic Attributes for Prospect Identification and Reservoir Characterization" Society of Exploration Geophysicists; Chapter 6; Jul. 7, 2007; pp. 123-151 (29 pages).

Yilmaz, O.; "Seismic Data Analysis"; Society of Exploration Geophysicists; Chapter 11; vol. 2; 2001; pp. 1793-2027 (235 pages).

Gao, W et al.; "An improved pre-stack hydrocarbon detection method based on frequency decomposition and spectral decomposition", Society of Exploration Geophysicists; Aug. 27, 2018; pp. 3317-3321 (5 pages).

Li, Y. et al.; "Hydrocarbon detection for Ordovician carbonate reservoir using amplitude variation with offset and spectral decomposition", Interpretation; vol. 4; No. 3; Aug. 1, 2016; pp. SN11-SN30 (20 pages).

Xiaodong, W. et al.; "Application of spectral decomposition in hydrocarbon detection", SEG Technical Program Expanded Abstracts; Jan. 1, 2011; pp. 1041-1045 (5 pages).

Wilson, Adam et al., "Frequency-dependent AVO inversion", SEG Houston 2009 International Exposition and Annual Meeting, Oct. 2009, pp. 341-345 (5 pages).

Bouchaala, Fateh and Claude Guennou, "Estimation of viscoelastic attenuation of real seismic data by use of ray tracing software: Application to the detection of gas hydrates and free gas", Comptes Rendus Geoscience, ScienceDirect, Elsevier Masson SAS, vol. 344, Mar. 2012, pp. 57-66 (10 pages).

Chand, Shyam and Tim. A. Minshull, "The effect of hydrate content on seismic attenuation: A case study for Mallik 2L-38 well data, Mackenzie delta, Canada", Geophysical Research Letters, American Geophysical Union, vol. 31, L14609, 2004, pp. 1-4 (4 pages).

Priest, Jeffrey A. et al., "Attenuation of seismic waves in methane gas hydrate-bearing sand", Geophysical Journal International, vol. 164, Issue 1, Jan. 2006, pp. 149-159 (11 pages).

Wang, Yanghua, "Seismic time-frequency spectral decomposition by matching pursuit", Geophysics, Society of Exploration Geophysicists, vol. 72, No. 1, Jan.-Feb. 2007, pp. V13-V20 (8 pages).

Wang, Zhiguo et al., "3D seismic attributes for a tight gas sand reservoir characterization of the eastern Sulige gas field, Ordos Basin, China", Geophysics, Society of Exploration Geophysicists, vol. 80, No. 2, Mar.-Apr. 2015, pp. B35-B43 (9 pages).

Wang, Zhiguo et al., "Application of 3D seismic attributes to optimize the placement of horizontal wells within a tight gas sand reservoir, Ordos Basin, China", Geophysics, Society of Exploration Geophysicists, vol. 81, No. 3, May-Jun. 2016; pp. B77-B86 (10 pages).

Wood, Warren T. et al., "In Situ Measurements of P-Wave Attenuation in the Methane Hydrate-and Gas-Bearing Sediments of the Blake Ridge", Proceedings of the Ocean Drilling Program, Scientific Results, vol. 164, 2000, pp. 265-272 (8 pages).

Yang, Zhifang et al., "Tight gas detection based on the reflectivity dispersion technology", Petroleum Exploration and Development, Research Institute of Petroleum Exploration and Development, ScienceDirect, Elsevier B.V., vol. 41, Bsue 5, Oct. 2014, pp. 628-633 (6 pages).

Final Office Action issued in corresponding U.S. Appl. No. 17/064,025 dated Mar. 9, 2022 (18 pages).

* cited by examiner

METHOD AND SYSTEM FOR PROCESSING A THREE-DIMENSIONAL (3D) SEISMIC DATASET

BACKGROUND

Seismic imaging allows a user to understand geological formations and characterize hydrocarbon resources located in subsurface reservoirs. In some cases, structural variations of the reservoir create noise or multiple signals that limit the amount or quality of information that may be extracted from a three-dimensional seismic imaging dataset. Accordingly, there exists a need for advanced methods of processing a three-dimensional seismic dataset to assist in hydrocarbon exploration and reservoir characterization.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a method of processing a three-dimensional (3D) seismic dataset, the method including: producing a relative amplitude preserved (RAP) processed seismic volume that includes a reservoir from the 3D seismic dataset; decomposing the RAP processed seismic volume into a first iso-frequency volume; generating a first overburden sediment interval map and a first reservoir interval zone map for the first iso-frequency volume; generating and outputting a first ratio map for the first iso-frequency volume by dividing the first overburden sediment interval map by the first reservoir interval zone map; and characterizing a fluid content of the reservoir based on the first ratio map.

In another aspect, embodiments disclosed herein relate to a non-transitory computer readable medium (CRM) storing computer readable program code for processing a three-dimensional (3D) seismic dataset, the program code causes a computer to: produce a relative amplitude preserved (RAP) processed seismic volume that includes a reservoir from the 3D seismic dataset; decompose the RAP processed seismic volume into a first iso-frequency volume; generate a first overburden sediment interval map and a first reservoir interval zone map for the first iso-frequency volume; generate and output a first ratio map for the first iso-frequency volume by dividing the first overburden sediment interval map by the first reservoir interval zone map; and characterize a fluid content of the reservoir based on the first ratio map.

In yet another aspect, embodiments disclosed herein relate to a system including: a reservoir comprising overburden sediment interval; a reservoir interval zone disposed below the overburden sediment interval; and a well that accesses a fluid content of the reservoir. A location of the well relative to the fluid content of the reservoir is determined by: producing a relative amplitude preserved (RAP) processed seismic volume that includes the reservoir from the 3D seismic dataset; decomposing the RAP processed seismic volume into a first iso-frequency volume; generating a first overburden sediment interval map and a first reservoir interval zone map for the first iso-frequency volume; generating and outputting a first ratio map for the first iso-frequency volume by dividing the first overburden sediment interval map by the first reservoir interval zone map; and characterizing the fluid content of the reservoir based on the first ratio map.

Other aspects and advantages of the claimed subject matter will be apparent from the following description and the appended claims.

DETAILED DESCRIPTION

Figure 1:
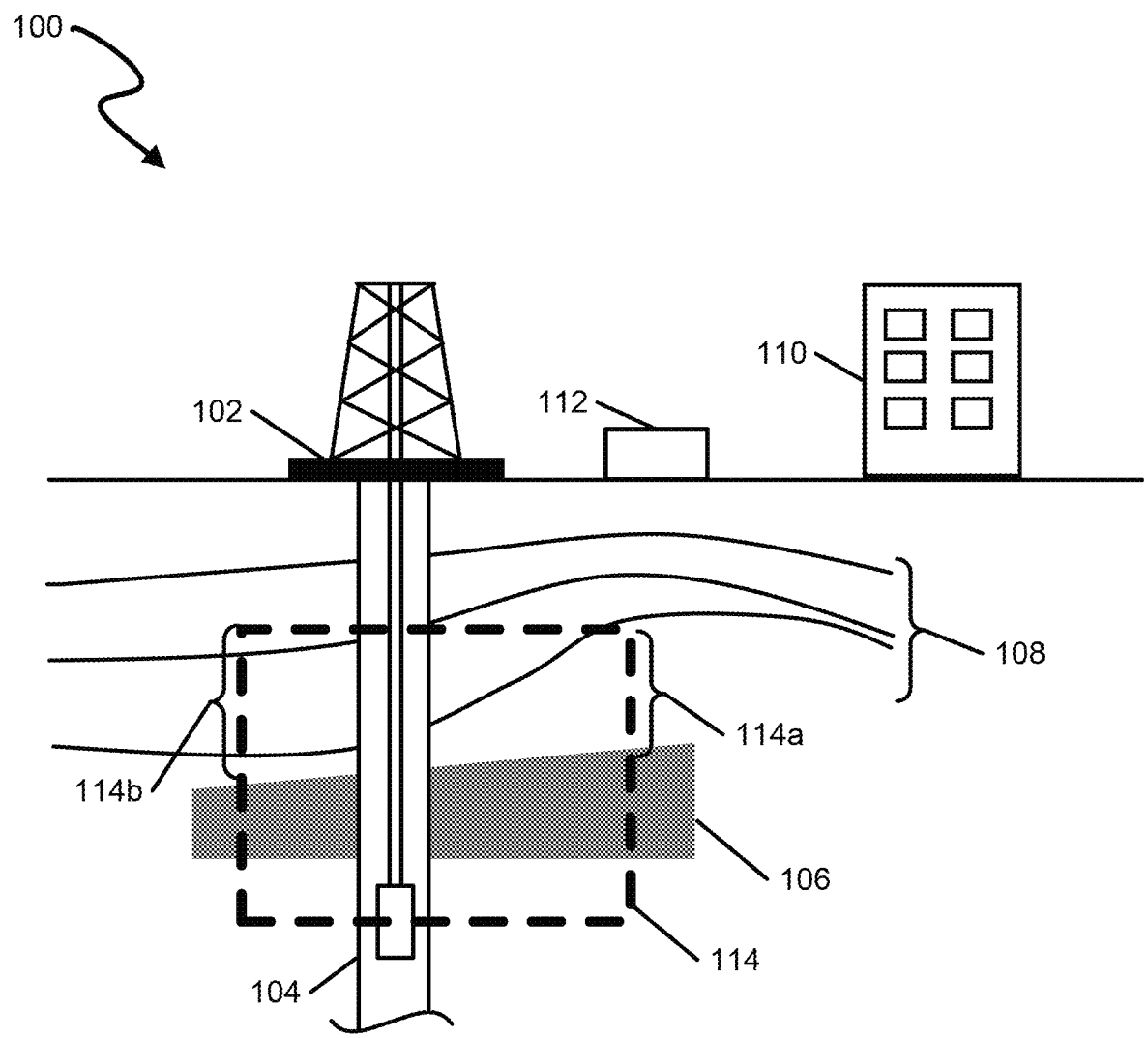
FIG. 1 shows a schematic of an oil and gas production facility.

Specific embodiments of the present disclosure will now be discussed in detail with reference to the accompanying figures. Like elements in the various figures are denoted by like reference numerals for consistency.

Numerous specific details are set forth in the following detailed description in order to provide a more thorough understanding of embodiments of the present disclosure. However, it will be apparent to one of ordinary skill in the art that the present disclosure may be practiced without these specific details. In other instances, well-known features have not been described to avoid unnecessarily complicating the description.

Throughout the description, ordinal numbers (e.g., first second, third, etc.) may be used as an adjective for an element (i.e., any noun in the description). The use of ordinal numbers is not to imply or create a particular ordering of elements nor to limit any element to being only a single element unless expressly disclosed, such as by the use of the terms "before," "after," "single," and other such terminology. Rather the use of ordinal numbers is to distinguish between the elements. By way of example, a first element is distinct from a second element, and the first element may encompass more than one element and succeed (or precede) the second element in an ordering of elements.

In general, embodiments disclosed herein provide a method, a non-transitory computer readable medium (CRM), and a reservoir for characterizing and accessing a fluid content of a hydrocarbon reservoir. More specifically, embodiments disclosed herein are directed to a method of utilizing and extracting information from RAP 3D seismic data to assist in hydrocarbon exploration and reservoir characterization.

For example, as shown in FIG. 1, an oil and gas production facility 100 may include a rig 102 and a well 104 that access a reservoir 106 within a geological formation 108. The reservoir 106 may include one or more fields of fluid content. A fluid content may include a hydrocarbon fluid (e.g., oil, water, brine, etc.), a hydrocarbon gas (e.g., natural gas), a production fluid (e.g., water, injection solution, slurry), or any combination thereof. The fluid content may be extracted from the well 104 for direct characterization. For example, the reservoir 106 may be pressurized with an injection solution (e.g., conventional water injection, specialized aqueous solution injection) from a second well 104 (not shown). However, it may be advantageous to characterize the fluid content (e.g., determine a type of fluid) without the cost and time-consuming steps of establishing a rig 102 and well 104.

Figure 8:
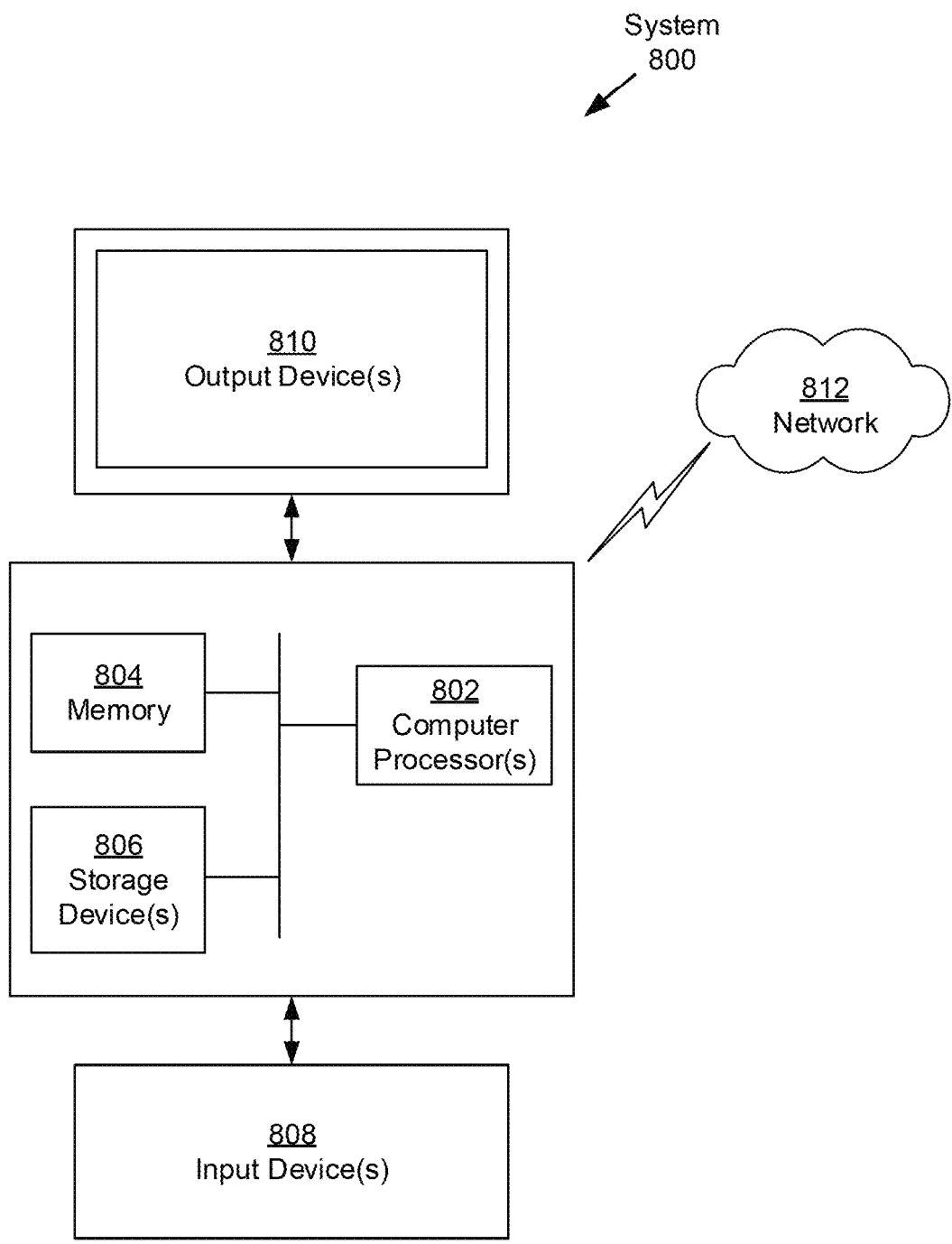
FIG. 8 shows a system for processing a three-dimensional seismic dataset according to one or more embodiments.

Therefore, a research facility 110 may utilize a computing device, as described in further detail below with respect to FIG. 8, to analyze three-dimension (3D) seismic datasets collected by a seismic imaging system 112 to characterize the fluid content and identify a location of a reservoir 106 or a location for placement of a rig 102 and a well 104 to access a fluid content of a reservoir 106. Generally, a seismic imaging system 112 uses an excitation source (e.g., one or more vibrators, shockwave generators, air guns, etc.) to transmit waves into the subterranean geological formation 108 and records time, frequency, and location information of the reflected/scattered waves (e.g., with one or more microphones, geophones, sensors disposed in a known configuration with respect to the excitation source) from various strata within the geological formation 108 (e.g., an overburden sediment interval above a reservoir 106). The 3D seismic dataset may represent a seismic volume 114 that includes a reservoir 106 and one or more fields of fluid content within the reservoir 106. A 3D seismic dataset may be analyzed in various ways to display different information about the reservoir 106 and the fluid content within. However, structural variations of the reservoir (e.g., a difference in depth 114a, 114b within the seismic volume 114) may create noise or multiple signals that limit the amount or quality of information that may be extracted from the 3D seismic imaging dataset.

Figure 2:
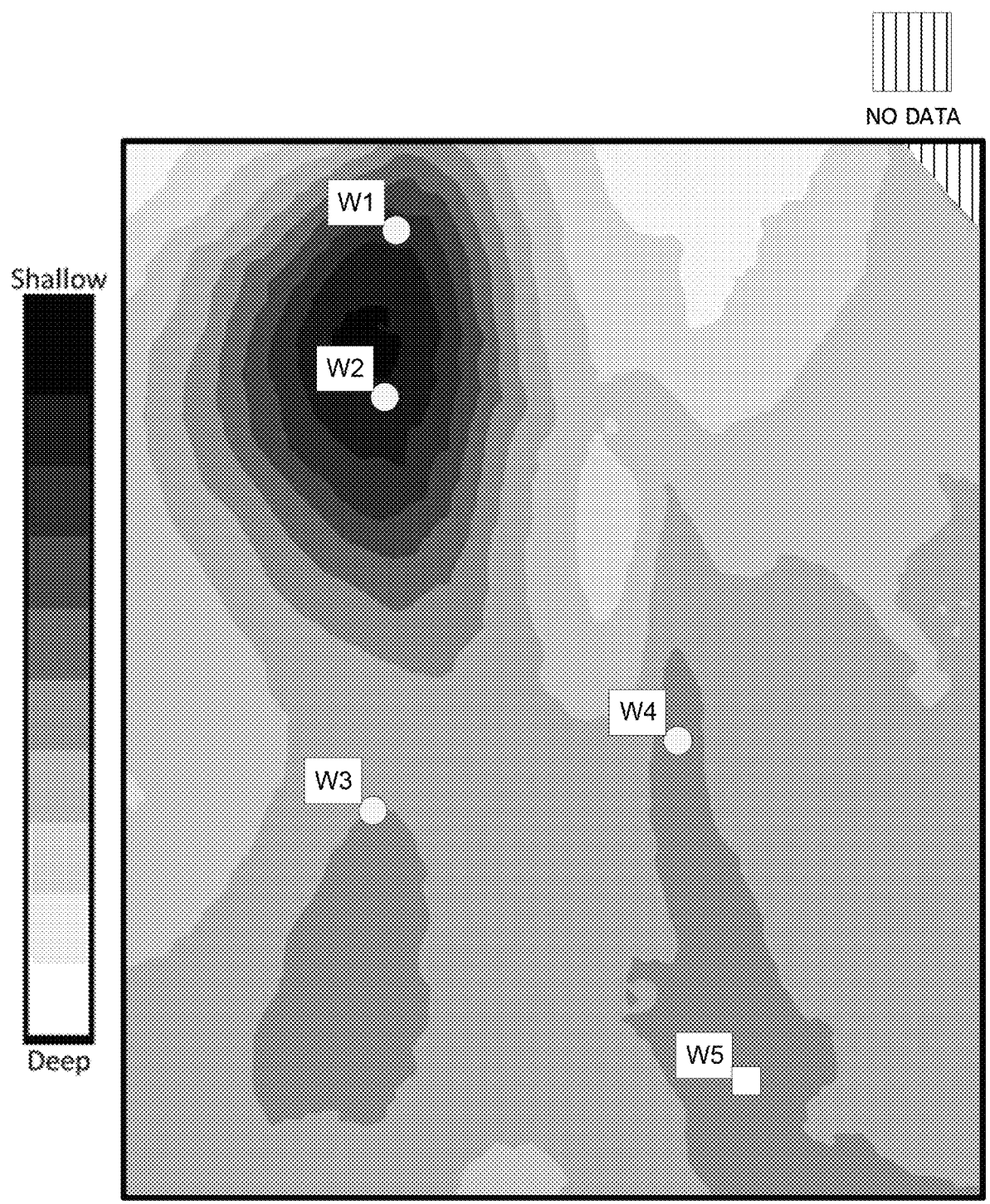
FIG. 2 shows a time structure map of a reservoir.

For example, FIG. 2 shows a time structure map, derived from a 3D seismic dataset, of a reservoir 106 with multiple fields that have different structural variations. A time structure map is based on timing differences of reflected/scattered waves from different regions of the reservoir within the imaged seismic volume. For example, waves reflected from an overburden sediment interval above a top of a reservoir 106 will return at different times based on the relative depth of different regions of the overburden sediment interval (e.g. waves reflected from higher strata will be return sooner than waves reflected from strata at deeper levels). From the time structure map, it is apparent that there is variation in the structural depth of the various fields within the reservoir 106. For example, wells W1, W2 access a field with a relatively shallow depth in the upper left corner of the time structure map. On the other hand, wells W3, W4, W5 access two separate fields with relatively deep depths in the lower half of the time structure map. Wells W1, W2, W3, W4 are gas wells (e.g., a well that is drilled and produces gas) and are indicated by white circles. Well W5 is a wet well (e.g., a well that is drilled and produces water) and is indicated by a white square).

Figure 3:
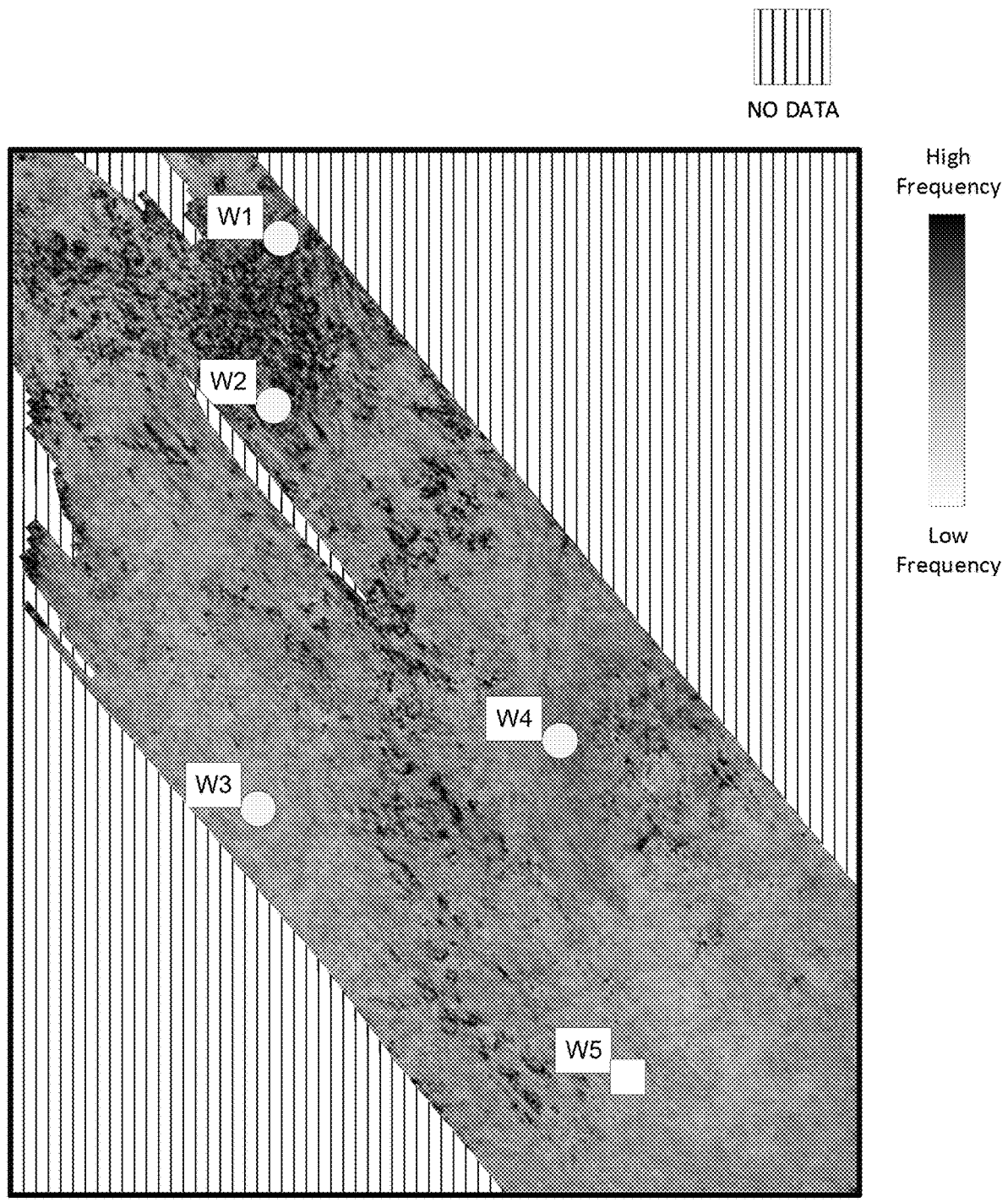
FIG. 3 shows a dominant frequency map of a reservoir.

FIG. 3 shows a dominant frequency map of the reservoir 106 with multiple fields that have different structural variations. A dominant frequency map is derived from a dominant frequency volume, which is derived from the same original 3D seismic dataset used to extract the time structure map. In seismic imaging, frequency attenuation occurs as waves propagate through earth. For example, the waves tend to lose high frequency content when travelling deeper into the subsurface (e.g., various strata act like a low-pass filters that pass lower frequencies and filter out higher frequencies of the waves with increased travel time and/or depth). A dominant frequency map is based on the different dominant frequencies that travel through a reservoir interval zone (i.e., the interval from a top of reservoir to a bottom of the reservoir). The dominant frequency that travels through each region of reservoir interval zone is affected by the structural depth differences and thickness variations of the overburden sediment interval accumulated on top of the reservoir interval zone. For example, relatively high dominant frequencies cover the upper left corner of the dominant frequency map where wells W1, W2 access a field with a relatively shallow depth. On the other hand, relatively low dominant frequencies cover the lower half of the dominant frequency map where wells W3, W4, W5 access fields with relatively deep depths (i.e., where high frequency content is lost due to the frequency attenuation effect).

Generally, the spectral and temporal responses captured in the 3D seismic dataset are controlled by four key factors: effective attenuation, stratigraphy (i.e., reflectivity series), reservoir thickness, and fluid type. Processing 3D seismic datasets with Frequency Spectral Decomposition (FSD) is useful for characterizing these key factors in a reservoir. FSD involves using broadband surface seismic data to generate iso-frequency volumes, where each iso-frequency volume corresponds to a single frequency value. However, conventional FSD processing methods may produce anomalously high attenuation at a reservoir depth or a high amplitude of low frequency event shadow beneath the reservoir, which results in inaccurate characterization of the reservoir and fluid content.

Figure 4:
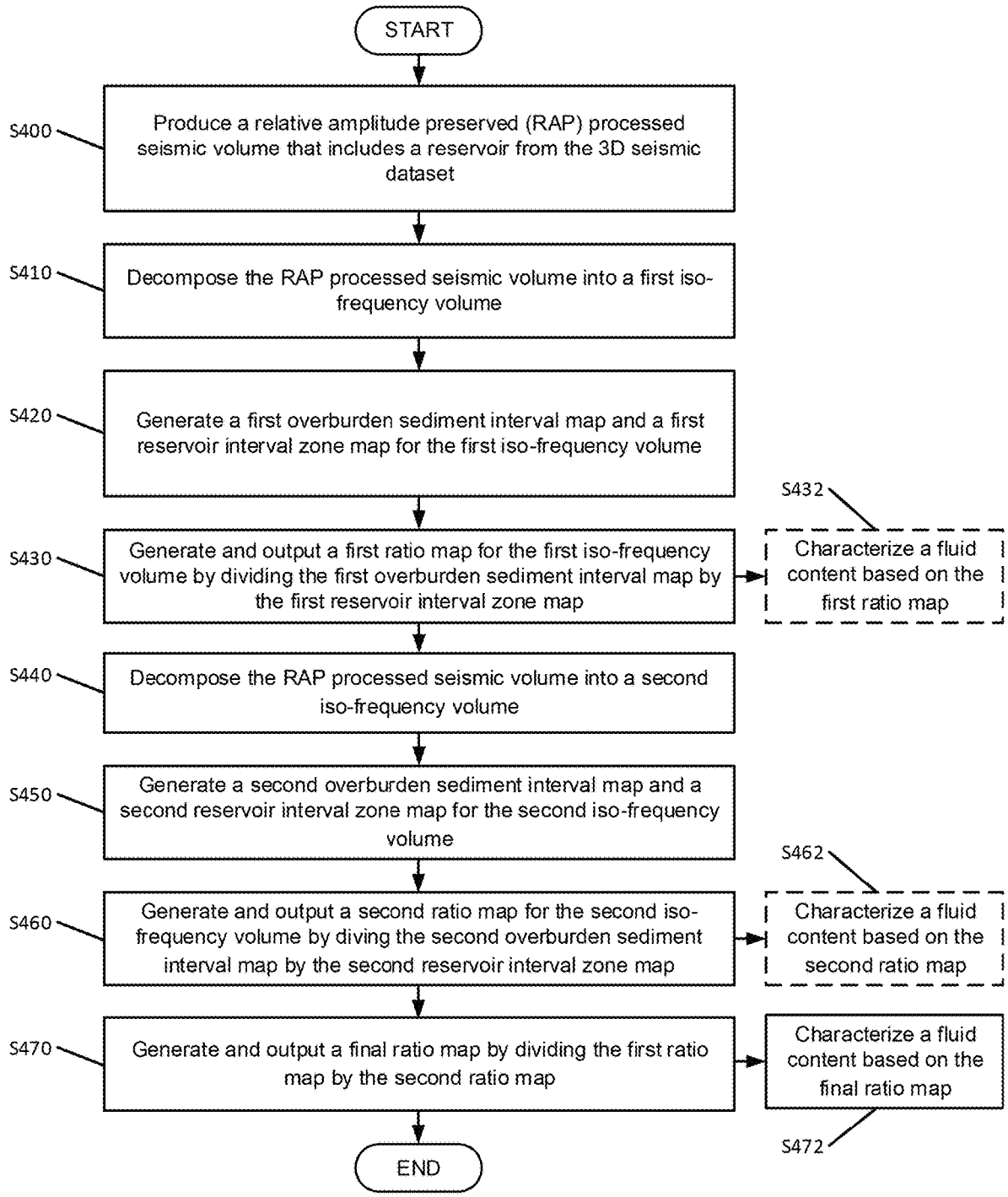
FIG. 4 shows a flowchart of a method for processing a three-dimensional seismic dataset according to one or more embodiments.
Figure 5:
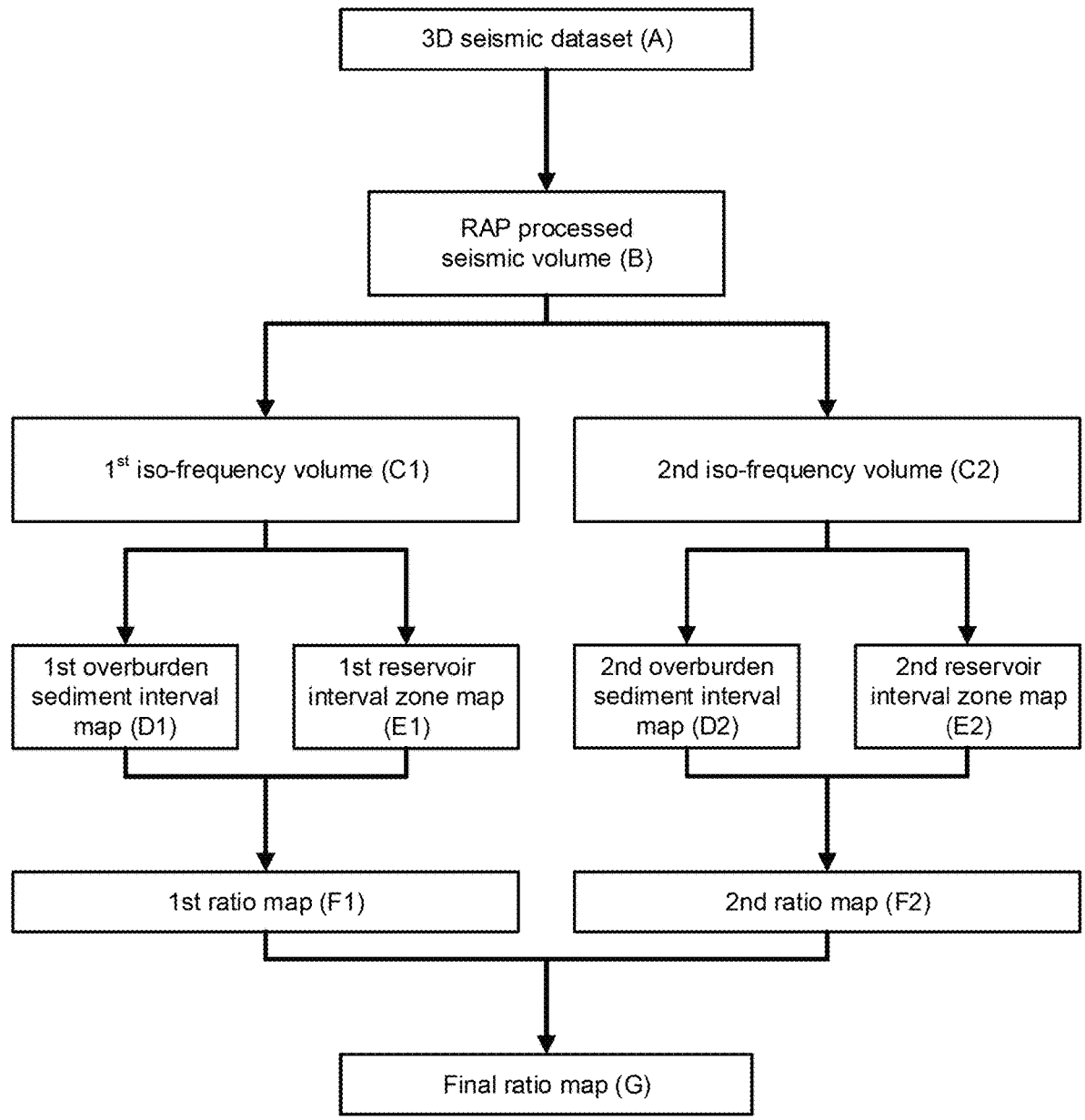
FIG. 5 shows a flowchart of data used to produce a final ratio map according to one or more embodiments.

FIGS. 4 and 5 show a flowchart of a method for processing a three-dimensional seismic dataset and a flow diagram of data types according to one or more embodiments, respectively. In one or more embodiments, one or more steps shown in FIG. 4 may be combined, omitted, repeated, and/or performed in a different order that the order shown in FIG. 4. Similarly, in one or more embodiments, one or more data types shown in FIG. 5 may be combined, omitted, repeated, and/or generated in a different order that the order shown in FIG. 5. Accordingly, the scope of the present disclosure should not be considered limited to the specific arrangement of steps shown in FIG. 4 or the flow of data types shown in FIG. 5. The below discussion refers to FIGS. 4 and 5 simultaneously, the S40X being steps of the flowchart of FIG. 4 and the A, B, C1, etc., referring to the flow diagram of FIG. 5.

At S400, a 3D seismic dataset (A) may be processed to produce a Relative Amplitude Preserved (RAP) seismic processed volume (B) that includes a reservoir. The RAP seismic volume (B) preserves the relative amplitude of the seismic imaging waves in a lateral direction and better represents the subsurface features within the reservoir when compared to the original 3D seismic dataset (A) or a conventional 3D seismic dataset. The RAP seismic processed volume (B) may utilize a broader frequency spectrum to avoid loss of information during the additional processing steps described below. The RAP processed data obtained in S400 is noise and multiple-free. A multiple is a seismic primary energy that has been reflected more than one time (e.g., echoes of waves from multiple strata or formations).

At S410, the RAP processed seismic volume (B) is decomposed into a first iso-frequency volume (C1). For example, FSD may be used to decompose the RAP processed seismic volume (B) to produce the first iso-frequency volume (C1) based on a first frequency (e.g., 10 Hz). Iso-frequency volumes are volumes that have a single frequency value. A person skilled in the art will appreciate that other processing techniques or any appropriate algorithm may be used to generate the first iso-frequency volume (C1). The first iso-frequency volume (C1) may be one of a plurality of iso-frequency volumes generated from the RAP processed seismic volume (B), as described in further detail below.

At S420, the first iso-frequency volume (C1) is processed to generate a first overburden sediment interval map (D1) and a first reservoir interval zone map (E1). The first overburden sediment interval map (D1) is a two-dimensional (2D) iso-frequency map, based on the first frequency, of a vertical interval extending from a top of the reservoir to a top of the seismic section (i.e., the top of the first iso-frequency volume (C1)). The first reservoir interval zone map (E1) is a 2D iso-frequency map, based on the first frequency, of a vertical interval extending from a bottom of the reservoir to the top of the reservoir.

At S430, a first ratio map (F1) at the first frequency is generated by dividing the first overburden sediment interval map (D1) by the first reservoir interval zone map (E1). The first ratio map (F1) may be output by any appropriate means (e.g., printed, downloaded, displayed, etc.).

At S432, a fluid content of the reservoir may optionally be characterized based on the first ratio map (F1). For example, a type of fluid in one or more fields of the reservoir may be determined based on the relative amplitudes in the first ratio map (F1). A person skilled in the art will appreciate that other types of information about the fluid content (e.g., lateral extent of a fluid content, potential well locations to access the fluid content, etc.) may be determined based on the first ratio map (F1).

At S440, the RAP processed seismic volume (B) is decomposed into a second iso-frequency volume (C2). For example, FSD may be used to decompose the RAP processed seismic volume (B) to produce the second iso-frequency volume (C2) based on a second frequency (e.g., 20 Hz). A person skilled in the art will appreciate that other processing techniques or any appropriate algorithm may be used to generate the second iso-frequency volume.

As discussed above, the second iso-frequency volume (C2) may be one of a plurality of iso-frequency volumes generated from the RAP processed seismic volume (B). In one or more embodiments, the first frequency of the first iso-frequency volume (C1) may be less than the second frequency of the second iso-frequency volume (C2). In one or more embodiments, frequencies of the plurality of iso-frequency volumes may be offset by multiples of 5 Hz (e.g., the first iso-frequency volume (C1) and second iso-frequency volume (C2) are 10 Hz and 20 Hz).

At S450, the second iso-frequency volume (C2) is processed to generate a second overburden sediment interval map (D2) and a second reservoir interval zone map (E2). The second overburden sediment interval map (D2) is a 2D iso-frequency map, based on the second frequency, of a vertical interval extending from a top of the reservoir to a top of the seismic section (i.e., the top of the second iso-frequency volume (C2)). The second reservoir interval zone map (E2) is a 2D iso-frequency map, based on the second frequency, of a vertical interval extending from a bottom of the reservoir to the top of the reservoir.

At S460, a second ratio map (F2) at the second frequency is generated by dividing the second overburden sediment interval map (D2) by the second reservoir interval zone map (E2). The second ratio map (F2) may be output by any appropriate means (e.g., printed, downloaded, displayed, etc.).

At S462, a fluid content of the reservoir may optionally be characterized based on the second ratio map (F1). For example, a type of fluid in one or more fields of the reservoir may be determined based on the relative amplitudes in the second ratio map (F2). A person skilled in the art will appreciate that other types of information about the fluid content (e.g., lateral extent of a field, potential well locations to access the fluid content, etc.) may be determined based on the second ratio map (F2). In one or more embodiments, a fluid content of the reservoir may be characterized based on both of the first ratio map (F1) and the second ratio map (F2).

At S470, a final ratio map (G) is generated by dividing the first ratio map (F1) by the second ratio map (F2). The final ratio map (G) may be output by any appropriate means (e.g., printed, downloaded, displayed, etc.).

At S472, a fluid content of the reservoir may be characterized based on the final ratio map (G). For example, a type of fluid in one or more fields of the reservoir may be determined based on the relative amplitudes in the final ratio map (G). A person skilled in the art will appreciate that other types of information about the fluid content (e.g., lateral extent of a field, potential well locations to access the fluid content, etc.) may be determined based on the final ratio map (G). In one or more embodiments, a fluid content of the reservoir may be characterized based on one or more of the first ratio map (F1), the second ratio map (F2), and the final ratio map (G).

Figure 6:
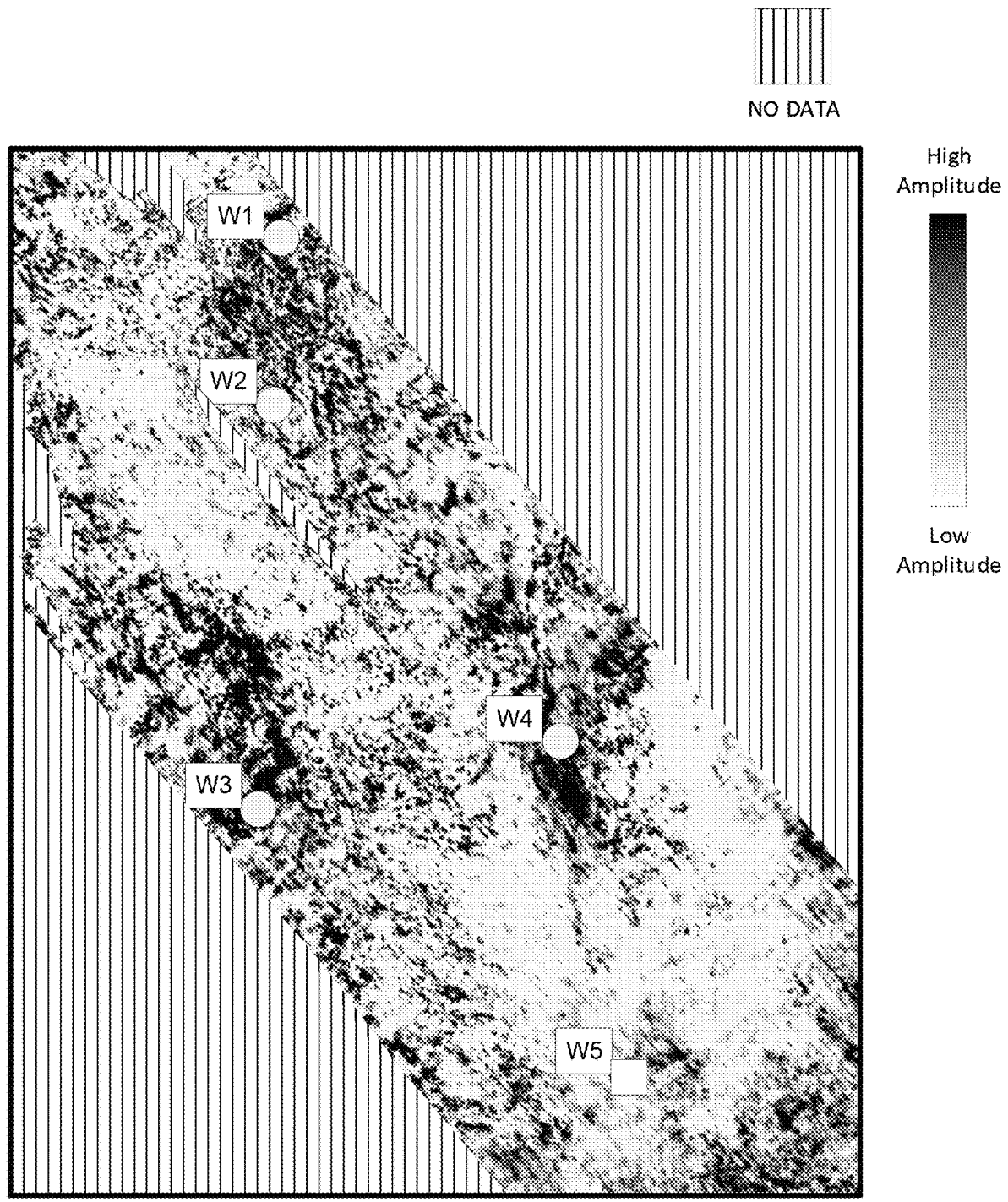
FIG. 6 shows a final ratio map according to one or more embodiments.

FIG. 6 shows a final ratio map (G) that may be generated from S470 in FIG. 4 above, according to one or more embodiments. As discussed above with reference to S472, a type of fluid in one or more fields of the reservoir may be determined based on the relative amplitudes in the final ratio map (G). In one or more embodiments, regions of high amplitude in the final ratio map (G) may indicate a gas fluid content. Accordingly, each of the wells W1, W2, W3, W4 may be constructed as gas type wells. Furthermore, the locations of gas wells W1, W2, W3, and W4 may be determined based on the features and locations of high amplitude regions of the final ratio map (G). In one or more embodiments, regions of low amplitude in the final ratio map (G) may indicate a wet fluid content. Accordingly, well W5 may be constructed as a wet type well. Furthermore, the location of wet well W5 may be determined based on the features and locations of low amplitude regions of the final ratio map (G).

Figure 7:
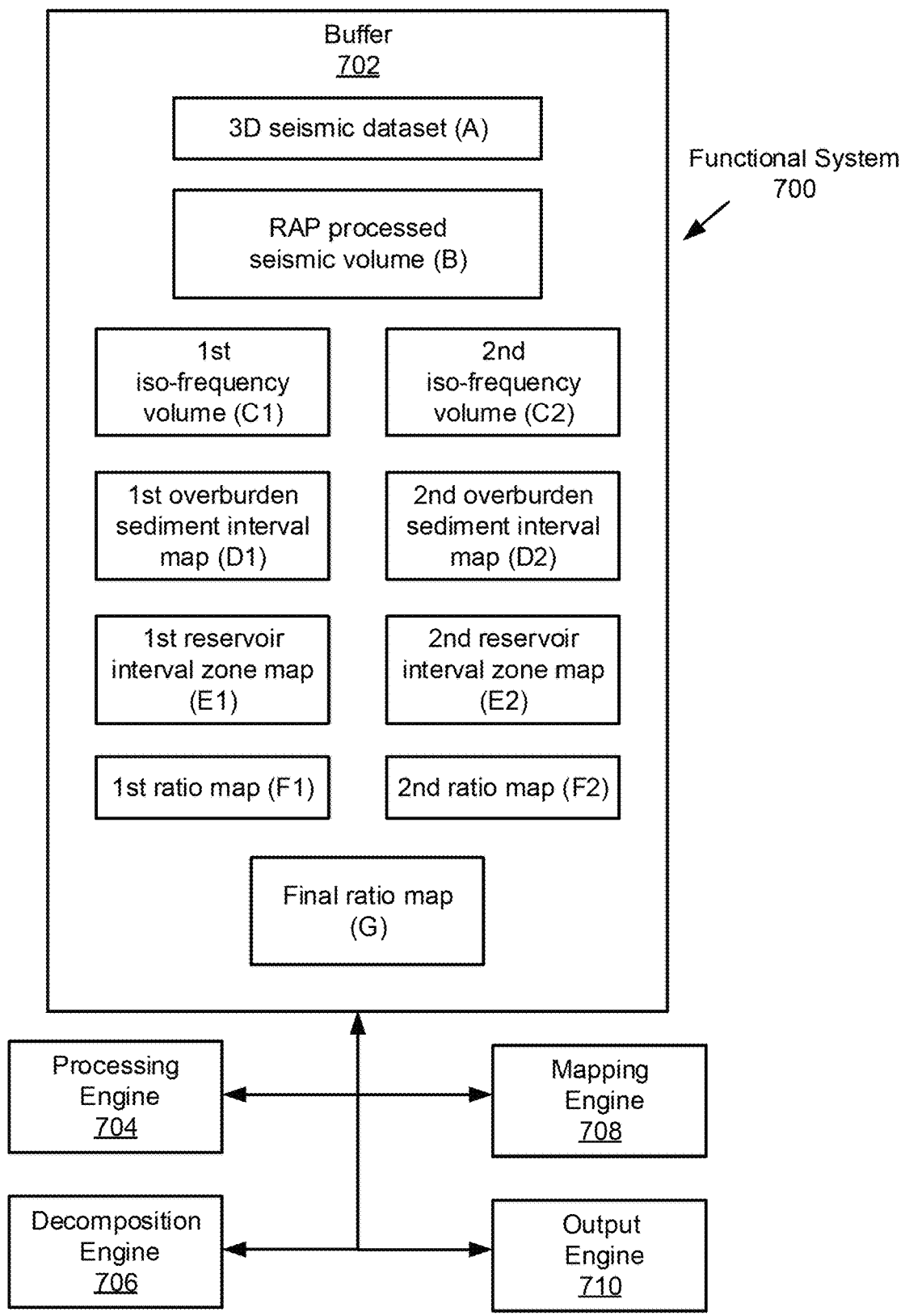
FIG. 7 shows a functional system for processing a three-dimensional seismic dataset according to one or more embodiments.

FIG. 7 shows a functional system for processing a 3D seismic dataset according to one or more embodiments. As shown in FIG. 7, the functional system 700 has multiple components, and may include, for example, a buffer 702, a processing engine 704, a decomposition engine 706, a mapping engine 708, and an output engine 710. Each of these components (702, 704, 706, 708, 710) may be located on the same computing device (e.g., a personal computer (PC), laptop, tablet PC, smartphone, multifunction peripheral, kiosk, server, and Projection with Interactive Capture (PIC) device) or on different computing devices connected by a network of any size having wired and/or wireless segments. Each of these components is discussed below.

The buffer 702 may be implemented in hardware (i.e., circuitry), software, or any combination thereof. The buffer 702 is configured to store one or more of: a 3d seismic dataset (A); a RAP processed seismic volume (B); an iso-frequency volume (e.g., a first iso-frequency volume (C1) and a second iso-frequency volume (C2)); an overburden sediment interval map (e.g., a first overburden sediment interval map (D1) and a second overburden sediment interval map (D2)); a reservoir interval zone map (e.g., a reservoir interval zone map (E1) and a second reservoir interval zone map (E2)); a ratio map (e.g., a first ratio map (F1), a second ratio map (F2), and a final ratio map (G)). Multiple versions of each of the above data elements may be stored in the buffer 702.

The system 700 includes the processing engine 704. The processing engine 704 may be implemented in hardware (i.e., circuitry), software, or any combination thereof. The processing engine 704 processes a 3D seismic dataset (A) to produce a RAP processed seismic volume (B). Any common or proprietary program that is able to produce a RAP processed seismic volume may be utilized by processing engine 704. The processing engine 704 may store the RAP processed seismic volume (B) in the buffer 702.

The system 700 further includes the decomposition engine 706. The decomposition engine 706 may be implemented in hardware (i.e., circuitry), software, or any combination thereof. The decomposition engine 706 decomposes the RAP processed seismic volume (B) into one or more iso-frequency volumes (e.g., a first iso-frequency volume (C1) and a second iso-frequency volume (C2)) based on one or more frequencies. Any common or proprietary program that is able to generate an iso-frequency volume may be utilized by the decomposition engine 706. The decomposition engine 706 may store the iso-frequency volumes in the buffer 702.

The decomposition engine 706 may include one or more controls (virtual or physical) for a user to manipulate the frequencies used to generate iso-frequency volumes. In one or more embodiments, frequencies may be offset by regular intervals (e.g., 5 Hz), irregular intervals, user selected values, or computationally optimized values. The controls of the decomposition engine 706 are not limited to the examples described herein and that any appropriate controls may be included.

The system 700 further includes the mapping engine 708. The mapping engine 708 may be implemented in hardware (i.e., circuitry), software, or any combination thereof. The mapping engine 708 generates various maps based on one or more iso-frequency volumes. The mapping engine 708 may generate one or more overburden sediment interval maps (e.g., a first overburden sediment interval map (D1) and a second overburden sediment interval map (D2)) and one or more reservoir interval zone maps (e.g., a first reservoir interval zone map (E1) and a second reservoir interval zone map (E2)) based on one or more iso-frequency volumes. Furthermore, the mapping engine 708 may generate a ratio map (e.g., a first ratio map (F1) and a second ratio map (F2)) by dividing an overburden sediment interval map by a reservoir interval zone map. Further still the mapping engine 708 may generate a final ratio map (G) by dividing a first ratio map by a second ratio map. Any common or proprietary program that is able to render or generate a map based on iso-frequency volume information may be utilized by the mapping engine 708.

The mapping engine 708 may include one or more controls (virtual or physical) for a user to manipulate one or more of: the geometric extent of the overburden sediment interval and the reservoir interval zone within the RAP processed seismic volume, the data elements used to calculate a ratio map. In one or more embodiments, data elements from different iso-frequency volumes may be used to calculate a ratio map (e.g., a first overburden sediment interval map (D1) and a second reservoir interval zone map (E2) to produce a hybrid ratio map). The controls of the mapping engine 708 are not limited to the examples described herein and that any appropriate controls may be included.

The system 700 may include the output engine 710. The output engine 710 may be implemented in hardware (i.e., circuitry), software, or any combination thereof. The output engine 710 may render, project, display, or otherwise present any data element stored in the buffer 702. The output engine 710 may display the data element on an output device of a physical system, described in further detail below.

Although the functional system 700 is shown as having five components (702, 704, 706, 708, and 710), in other embodiments of the invention, the functional system 700 may have more or fewer components. Furthermore, the functionality of each component described above may be shared among multiple components. In addition, each component (702, 704, 706, 708, and 710) may be utilized multiple times in serial or parallel to carry out an iterative operation.

Embodiments of the present disclosure may provide at least one of the following advantages: reducing uncertainty and improving the characterization of reservoirs and fluid content (e.g., fluid type) within fields of a reservoir; improving predictions of deep and shallow gas reservoirs; improving correlation between predictions of fluid content and actual fluid content data extracted from a well; reduce noise and multiples in relative amplitude preserved processed seismic volume datasets; increasing characterization confidence in hydrocarbon exploration, delineation, and development.

Embodiments of the invention may be implemented on virtually any type of computing system, regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. Some or all of the components of FIG. 7 may be implemented on a computing device as shown in FIG. 8. As shown in FIG. 8, the computing system 800 may include one or more computer processor(s) 802, associated memory 804 (e.g., random access memory (RAM), cache memory, flash memory), one or more storage device(s) 806 (e.g., a hard disk, an optical drive such as a compact disk (CD) drive or digital versatile disk (DVD) drive, a flash memory stick), and numerous other elements and functionalities. The computer processor(s) 802 may be an integrated circuit for processing instructions. For example, the computer processor(s) may be one or more cores, or micro-cores of a processor. The computing system 800 may also include one or more input device(s) 810, such as a camera, imager, seismic imager, external storage, keyboard, mouse, microphone, touchpad, electronic pen, or any other type of input device. Further, the computing system 800 may include one or more output device(s) 808, such as a projector, screen (e.g., a liquid crystal display (LCD), a plasma display, touchscreen, cathode ray tube (CRT) monitor, or other display device), a printer, external storage, or any other output device. One or more of the output device(s) may be the same or different from the input device(s). The computing system 800 may be connected to a network 812 (e.g., a local area network (LAN), a wide area network (WAN) such as the Internet, mobile network, or any other type of network) via a network interface connection (not shown). The input and output device(s) may be locally or remotely (e.g., via the network 812) connected to the computer processor(s) 802, memory 804, and storage device(s) 806. Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system 800 may be located at a remote location and be connected to the other elements over a network 812. Further, one or more embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. For example, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

Furthermore, those skilled in the art, having benefit of this disclosure, will appreciate that various other embodiments may be devised without departing from the scope of the present invention. Accordingly, the scope of the invention should be limited only by the attached claims.

What is claimed:

1. A method of processing a three-dimensional (3D) seismic dataset:
    producing a relative amplitude preserved (RAP) processed seismic volume that includes a reservoir from the 3D seismic dataset;
    decomposing the RAP processed seismic volume into a first iso-frequency volume;
    generating a first overburden sediment interval map and a first reservoir interval zone map for the first iso-frequency volume;
    generating and outputting a first ratio map for the first iso-frequency volume by dividing the first overburden sediment interval map by the first reservoir interval zone map; and
    characterizing a fluid content of the reservoir based on the first ratio map.

2. The method of claim 1, further comprising:
    decomposing the RAP processed seismic volume into a second iso-frequency volume;
    generating a second overburden sediment interval map and a second reservoir interval zone map for the second iso-frequency volume; and
    generating and outputting a second ratio map for the second iso-frequency volume by diving the second overburden sediment interval map by the second reservoir interval zone map, wherein
    characterizing the fluid content of the reservoir is further based on the second ratio map.

3. The method of claim 2, further comprising:
    generating and outputting a final ratio map by dividing the first ratio map by the second ratio map, wherein
    characterizing the fluid content of the reservoir is further based on the final ratio map.

4. The method of claim 2, wherein
    the first overburden sediment interval map and the second overburden sediment interval map extend from a top of the reservoir to a top of the first iso-frequency volume and the second iso-frequency volume, respectively.

5. The method of claim 2, wherein
    the first reservoir interval zone map and the second reservoir interval zone map extend from a bottom of the reservoir to a top of the reservoir.

6. The method of claim 2, wherein
    a frequency of the first iso-frequency volume is less than a frequency of the second iso-frequency volume.

7. The method of claim 6, wherein
    a frequency of the first iso-frequency volume and a frequency of the second iso-frequency volume are offset by a multiple of 5 Hz.

8. The method of claim 7, wherein
    the frequency of the first iso-frequency volume is 10 Hz.

9. The method of claim 7, wherein
    the frequency of the second iso-frequency volume is 20 Hz.

10. A non-transitory computer readable medium (CRM) storing computer readable program code for processing a three-dimensional (3D) seismic dataset, the program code causes a computer to:
    produce a relative amplitude preserved (RAP) processed seismic volume that includes a reservoir from the 3D seismic dataset;
    decompose the RAP processed seismic volume into a first iso-frequency volume;
    generate a first overburden sediment interval map and a first reservoir interval zone map for the first iso-frequency volume;
    generate and output a first ratio map for the first iso-frequency volume by dividing the first overburden sediment interval map by the first reservoir interval zone map; and
    characterize a fluid content of the reservoir based on the first ratio map.

11. The non-transitory CRM of claim 10, wherein
    the program code additionally causes the computer to:
        decompose the RAP processed seismic volume into a second iso-frequency volume;
        generate a second overburden sediment interval map and a second reservoir interval zone map for the second iso-frequency volume; and generate and output a second ratio map for the second iso-frequency volume by diving the second overburden sediment interval map by the second reservoir interval zone map, and characterizing the fluid content of the reservoir is further based on the second ratio map.

12. The non-transitory CRM of claim 11, wherein the program code additionally causes the computer to generate and output a final ratio map by dividing the first ratio map by the second ratio map, and characterizing the fluid content of the reservoir is further based on the final ratio map.

13. The non-transitory CRM of claim 11, wherein the first overburden sediment interval map and the second overburden sediment interval map extend from a top of the reservoir to a top of the first iso-frequency volume and the second iso-frequency volume, respectively; and the first reservoir interval zone map and the second reservoir interval zone map extend from a bottom of the reservoir to a top of the reservoir.

14. The non-transitory CRM of claim 11, wherein a frequency of the first iso-frequency volume is less than a frequency of the second iso-frequency volume.

15. The non-transitory CRM of claim 11, wherein a frequency of the first iso-frequency volume and a frequency of the second iso-frequency volume are offset by a multiple of 5 Hz.

16. A system comprising:

a reservoir comprising overburden sediment interval;

a reservoir interval zone disposed below the overburden sediment interval; and a well that accesses a fluid content of the reservoir, wherein a location of the well relative to the fluid content of the reservoir is determined by:

producing a relative amplitude preserved (RAP) processed seismic volume that includes the reservoir from the 3D seismic dataset;

decomposing the RAP processed seismic volume into a first iso-frequency volume;

generating a first overburden sediment interval map and a first reservoir interval zone map for the first iso-frequency volume;

generating and outputting a first ratio map for the first iso-frequency volume by dividing the first overburden sediment interval map by the first reservoir interval zone map; and characterizing the fluid content of the reservoir based on the first ratio map.

17. The system of claim 16, wherein the location of the well relative to the fluid content of the reservoir is further determined by:

decomposing the RAP processed seismic volume into a second iso-frequency volume;

generating a second overburden sediment interval map and a second reservoir interval zone map for the second iso-frequency volume; and generating and outputting a second ratio map for the second iso-frequency volume by diving the second overburden sediment interval map by the second reservoir interval zone map, and characterizing the fluid content of the reservoir is further based on the second ratio map.

18. The system of claim 17, wherein the location of the well relative to the fluid content of the reservoir is further determined by generating and outputting a final ratio map by dividing the first ratio map by the second ratio map, and characterizing the fluid content of the reservoir is further based on the final ratio map.

19. The system of claim 17, wherein in determining the location of the well relative to the fluid content of the reservoir:

the first overburden sediment interval map and the second overburden sediment interval map extend from a top of the reservoir to a top of the first iso-frequency volume and the second iso-frequency volume, respectively; and the first reservoir interval zone map and the second reservoir interval zone map extend from a bottom of the reservoir to a top of the reservoir.

20. The system of claim 17, wherein in determining the location of the well relative to the fluid content of the reservoir, a frequency of the first iso-frequency volume is less than a frequency of the second iso-frequency volume.

* * * * *